US012474363B2

(12) United States Patent
Otani et al.

(10) Patent No.: US 12,474,363 B2
(45) Date of Patent: Nov. 18, 2025

(54) INERTIAL MEASUREMENT UNIT

(71) Applicant: SEIKO EPSON CORPORATION, Tokyo (JP)

(72) Inventors: Fumikazu Otani, Matsumoto (JP); Taketo Chino, Hokuto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 3 days.

(21) Appl. No.: 18/462,922

(22) Filed: Sep. 7, 2023

(65) Prior Publication Data

US 2023/0417790 A1  Dec. 28, 2023

Related U.S. Application Data

(63) Continuation of application No. 17/511,997, filed on Oct. 27, 2021, now Pat. No. 11,789,032.

(30) Foreign Application Priority Data

Oct. 29, 2020 (JP) .................................. 2020-181708

(51) Int. Cl.
*G01P 1/00* (2006.01)
*G01P 3/00* (2006.01)
*G01P 15/18* (2013.01)

(52) U.S. Cl.
CPC ................ *G01P 1/006* (2013.01); *G01P 3/00* (2013.01); *G01P 15/18* (2013.01)

(58) Field of Classification Search
CPC ..................................................... G01P 1/006
USPC ........................................................ 73/497
See application file for complete search history.

(56) References Cited

U.S. PATENT DOCUMENTS

| 10,012,672 | B2 | 7/2018 | Toda et al. |
| 2011/0241656 | A1 | 10/2011 | Piemonte et al. |
| 2011/0246117 | A1 | 10/2011 | Moore et al. |
| 2015/0114082 | A1* | 4/2015 | Blanchard ............ G01C 25/005 73/1.77 |
| 2018/0052012 | A1 | 2/2018 | Nishizawa et al. |
| 2018/0086263 | A1* | 3/2018 | Moradi-Pari ......... B60W 30/09 |
| 2018/0172444 | A1* | 6/2018 | Thillainadarajah .... G01C 19/00 |
| 2019/0285663 | A1 | 9/2019 | Chino et al. |

(Continued)

FOREIGN PATENT DOCUMENTS

| CN | 110411496 A | * | 11/2019 | ......... G01C 19/5614 |
| JP | 8-021732 A | | 1/1996 | |
| JP | 2014-222238 A | | 11/2014 | |

(Continued)

OTHER PUBLICATIONS

Sato. Machine Translation of CN-110411496-A. Published Nov. 2019. Accessed Mar. 2024. (Year: 2019).*

*Primary Examiner* — Walter L Lindsay, Jr.
*Assistant Examiner* — Philip T Fadul
(74) *Attorney, Agent, or Firm* — Rankin, Hill & Clark LLP

(57) ABSTRACT

An inertial measurement unit includes an angular velocity sensor and an acceleration sensor that output inertial information, a storage portion that stores a plurality of correction parameters related to a range of values of the inertial information, a parameter control portion that selects a selection correction parameter from the plurality of correction parameters, and a correction calculation portion that corrects the inertial information using the selection correction parameter.

1 Claim, 11 Drawing Sheets

(56) References Cited

U.S. PATENT DOCUMENTS

2020/0039522 A1 2/2020 Nakaoka et al.
2020/0383609 A1* 12/2020 Aoki .................... G01C 25/005

FOREIGN PATENT DOCUMENTS

| JP | 2015-179002 A | 10/2015 |
| JP | 2017-110998 A | 6/2017 |
| JP | 2019-163955 A | 9/2019 |
| JP | 2020-020631 A | 2/2020 |

* cited by examiner

INERTIAL MEASUREMENT UNIT

The present application is a continuation of and claims priority from U.S. application Ser. No. 17/511,997, filed Oct. 27, 2021, the disclosure of which is hereby incorporated by reference herein in its entirety, and is based on and claims priority from JP Application Serial Number 2020-181708, filed Oct. 29, 2020, the disclosure of which is hereby incorporated by reference herein in its entirety.

BACKGROUND

1. Technical Field

The present disclosure relates to an inertial measurement unit.

2. Related Art

As a technique in the related art of an inertial measurement unit (IMU) having an angular velocity sensor device and an acceleration sensor device, for example, JP-A-2019-163955 describes a sensor module that converts analog signals output from the angular velocity sensor device and the acceleration sensor device into digital data and performs correction processing, such as temperature correction, offset correction, or sensitivity correction, on the digital data to improve the accuracy.

However, in the sensor module described in JP-A-2019-163955, a correction parameter for correcting sensitivity is fixed to a correction parameter calculated from a maximum detection range. Therefore, there is a problem that correction accuracy is low when a detection range of the sensor is narrow as compared with a value corrected by a correction parameter calculated from the narrow detection range.

SUMMARY

An inertial measurement unit includes an inertial sensor that outputs inertial information, a storage portion that stores a plurality of correction parameters related to a range of values of the inertial information, a parameter control portion that selects a selection correction parameter from the plurality of correction parameters, and a correction calculation portion that corrects the inertial information using the selection correction parameter.

DESCRIPTION OF EXEMPLARY EMBODIMENTS

1. First Embodiment

First, an inertial measurement unit 1 according to a first embodiment will be described with reference to FIGS. 1, 2, and 3.

Figure 1:
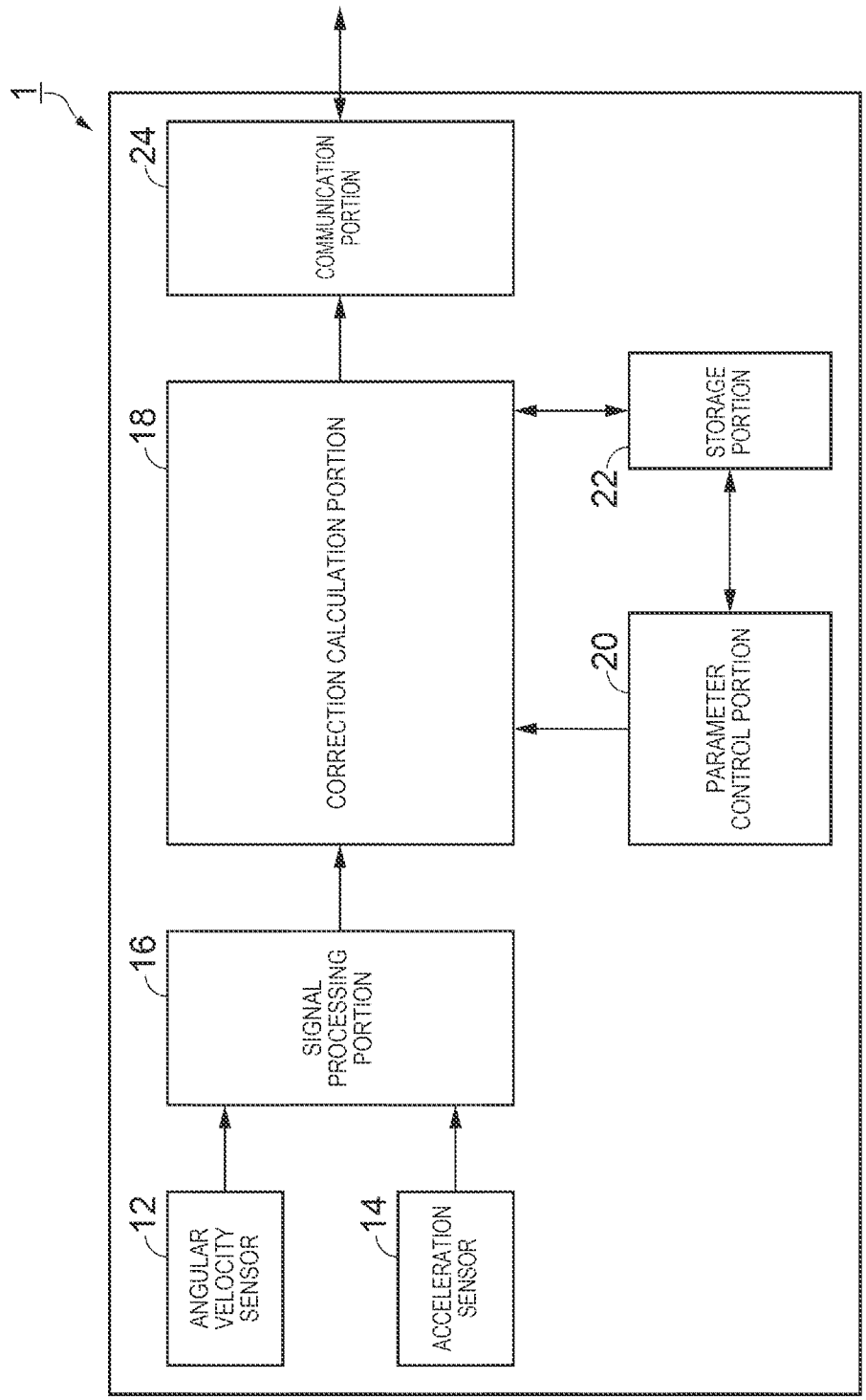
FIG. 1 is a block diagram showing a configuration of an inertial measurement unit according to a first embodiment.

As shown in FIG. 1, the inertial measurement unit 1 of the present embodiment includes an angular velocity sensor 12 and an acceleration sensor 14 as inertial sensors, a signal processing portion 16, a correction calculation portion 18, a parameter control portion 20, a storage portion 22, and a communication portion 24. Thus, inertial information in the present embodiment is an angular velocity output from the angular velocity sensor 12 and acceleration output from the acceleration sensor 14.

The angular velocity sensor 12 measures the angular velocity in each of three axial directions intersecting with each other and ideally orthogonal to each other and outputs an analog signal according to the magnitude and direction of the measured three axial angular velocities.

The acceleration sensor 14 measures the acceleration in each of the three axial directions intersecting with each other and ideally orthogonal to each other and outputs an analog signal according to the magnitude and direction of the measured three axial acceleration.

The signal processing portion 16 performs processing of sampling the output signal of the angular velocity sensor 12 at a predetermined sampling interval and converting the signal into angular velocity data having a digital value. The signal processing portion 16 performs processing of sampling the output signal of the acceleration sensor 14 at a predetermined sampling interval and converting the signal into acceleration data having a digital value.

The angular velocity sensor 12 and the acceleration sensor 14 may incorporate functions of A/D conversion and temperature correction.

The signal processing portion 16 outputs the angular velocity data and the acceleration data after the A/D conversion processing to the correction calculation portion 18.

The correction calculation portion 18 performs various types of processing according to a program stored in a ROM or recording medium of the storage portion 22 or a program received from a server through a network and stored in a RAM or recording medium of the storage portion 22.

The correction calculation portion 18 corrects the angular velocity data and the acceleration data output from the signal processing portion 16 using a selection correction parameter, corresponding to a detection range of an angular velocity or acceleration value designated by a user, selected by the parameter control portion 20 from the storage portion 22 that stores a plurality of correction parameters related to a detection range of an angular velocity or acceleration value.

The correction calculation portion 18 performs a predetermined calculation on the angular velocity data and the acceleration data output by the signal processing portion 16 at a predetermined sampling interval to perform correction processing on the angular velocity data and the acceleration data. The corrected angular velocity data and acceleration data output by the correction calculation portion 18 are output to the outside through the communication portion 24. The corrected angular velocity data and acceleration data are stored in the storage portion 22 as angular velocity information and acceleration information.

The parameter control portion 20 selects the selection correction parameter corresponding to a mode setting from among the plurality of correction parameters based on correction parameter selection information stored in the storage portion 22 in accordance with the mode setting input by the user from an input portion (not shown) of the correction calculation portion 18 and sets the selected parameter in the correction calculation portion 18.

Figure 2:
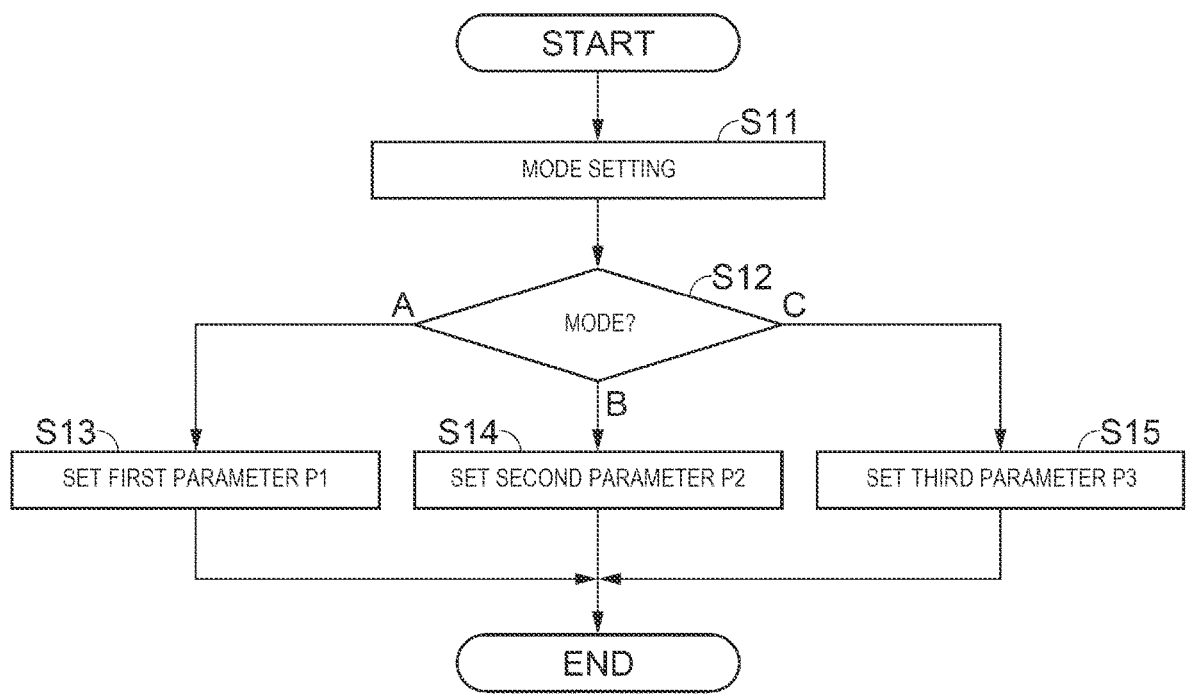
FIG. 2 is a flowchart showing a method of setting a correction parameter of a parameter control portion.

Specifically, as shown in FIG. 2, when the user sets a mode related to a detection range of a value of the inertial information in step S11, in a case of mode A in step S12, a first parameter P1 is selected from the storage portion 22 based on the correction parameter selection information, and the first parameter P1 is set in the correction calculation portion 18 as the selection correction parameter in step S13. In a case of mode B, a second parameter P2 is selected from the storage portion 22 based on the correction parameter selection information, and the second parameter P2 is set in the correction calculation portion 18 as the selection correction parameter in step S14. In a case of mode C, a third parameter P3 is selected from the storage portion 22 based on the correction parameter selection information, and the third parameter P3 is set in the correction calculation portion 18 as the selection correction parameter in step S15.

In the present embodiment, the range of values of the inertial information is a detection range of an angular velocity or acceleration value of the inertial measurement unit 1, and the selection correction parameters are different due to a difference in the detection range. For example, the first parameter P1 is a correction parameter when the detection range of the angular velocity value is ±500 dps, which is the maximum. The second parameter P2 is a correction parameter when the detection range of the angular velocity value is ±250 dps. The third parameter P3 is a correction parameter when the detection range of the value of the angular velocity is ±100 dps. Therefore, the correction parameter selection information is obtained by associating a mode in which conditions are divided by the detection range of the value of the inertial information with the corresponding correction parameter.

Ideally, the angular velocity sensor 12 and the acceleration sensor 14 are attached to the inertial measurement unit 1 such that three axes of each of the angular velocity sensor 12 and the acceleration sensor 14 coincide with three axes (x-axis, y-axis, and z-axis) of a sensor coordinate system, which is an orthogonal coordinate system defined for the inertial measurement unit 1. However, in reality, an error in an attachment angle occurs. The signal processing portion 16 also performs processing of converting the angular velocity data and the acceleration data into data of an xyz coordinate system using the correction parameter calculated in advance according to the attachment angle error. Further, the signal processing portion 16 also performs processing of performing the temperature correction on the angular velocity data and the acceleration data according to temperature characteristics of the angular velocity sensor 12 and the acceleration sensor 14.

The storage portion 22 stores the plurality of correction parameters related to the detection range of the value of the inertial information and the correction parameter selection information.

The storage portion 22 includes the ROM that stores the program for the correction calculation portion 18 to perform various types of processing, various programs for realizing application functions, data, or the like.

The storage portion 22 includes a RAM that is used as a work area of the correction calculation portion 18 and temporarily stores the program or data read out from the ROM, the calculation result executed by the correction calculation portion 18 according to various programs, the correction parameter selection information, the plurality of correction parameters related to the detection range of the value of the inertial information, and the like.

The storage portion 22 includes a non-volatile recording medium that stores data that needs to be saved for a long period among data generated by the processing of the correction calculation portion 18. The recording medium may store the program for the correction calculation portion 18 to perform various types of processing, various programs or data for realizing the application functions, or the like.

The communication portion 24 can transmit the inertial information corrected by the correction calculation portion 18 according to the detection range of the value of the inertial information to another unit or the like, and can receive a control signal or the like from another unit or the like.

Next, a correction parameter calculation and checking method of the inertial measurement unit 1 according to the present embodiment will be described with reference to FIG. 3. As the correction parameter calculation and checking method, the inertial measurement unit 1 including the angular velocity sensor 12 having the detection range of ±500 dps will be described as an example.

Figure 3:
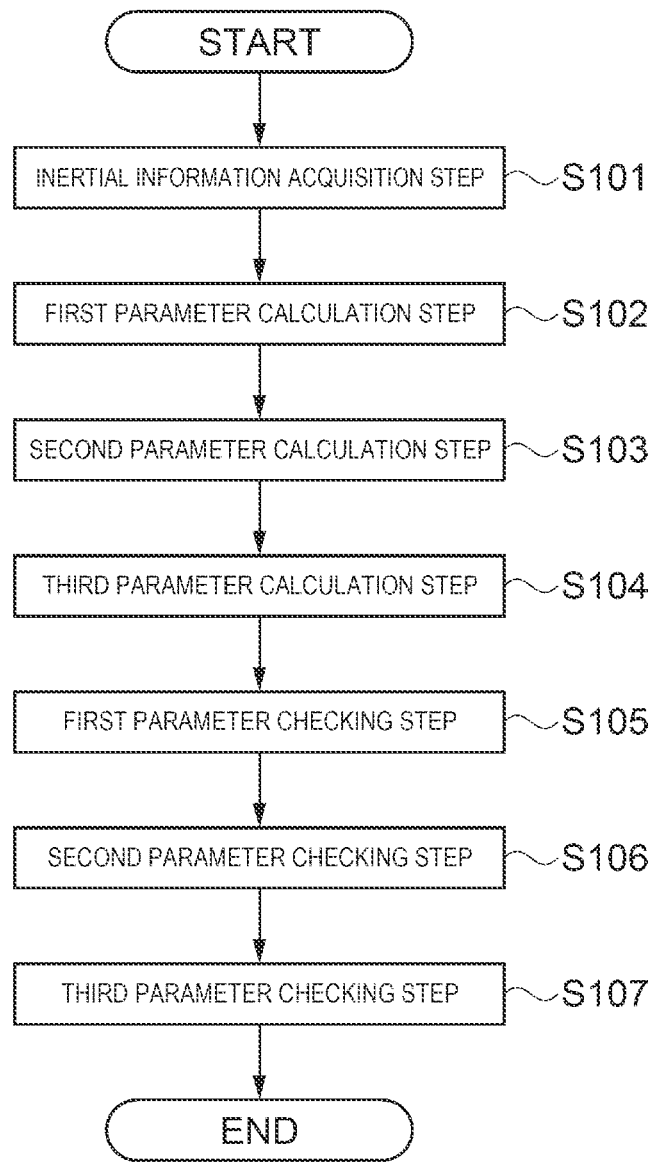
FIG. 3 is a flowchart showing a correction parameter calculation and checking method.

As shown in FIG. 3, the correction parameter calculation and checking method according to the present embodiment includes an inertial information acquisition step, a first parameter calculation step, a second parameter calculation step, a third parameter calculation step, a first parameter checking step, a second parameter checking step, and a third parameter checking step.

1.1 Inertial Information Acquisition Step

First, in step S101, a known angular velocity having an angular velocity range of ±500 dps is applied to the inertial measurement unit 1 in, for example, 5 dps steps to obtain the angular velocity data output from the signal processing portion 16 of the inertial measurement unit 1.

1.2 First Parameter Calculation Step

Next, in step S102, a non-linearity correction coefficient, which is an error with respect to linearity of the known angular velocity value, is calculated by the least-squares method or the like from the known angular velocity value having the angular velocity range of ±500 dps and the angular velocity data output from the signal processing portion 16 acquired in step S101 to obtain the first parameter P1.

1.3 Second Parameter Calculation Step

Next, in step S103, a known angular velocity value having the angular velocity range of ±250 dps and the angular velocity data output from the signal processing portion 16 are extracted and the non-linearity correction coefficient, which is the error with respect to linearity of the known angular velocity value, is calculated by the least-squares method or the like from the known angular velocity value having the angular velocity range of ±500 dps and the angular velocity data output from the signal processing portion 16 acquired in step S101 to obtain the second parameter P2.

1.4 Third Parameter Calculation Step

Next, in step S104, a known angular velocity value having the angular velocity range of ±100 dps and the angular velocity data output from the signal processing portion 16 are extracted and the non-linearity correction coefficient, which is the error with respect to linearity of the known angular velocity value, is calculated by the least-squares method or the like from the known angular velocity value having the angular velocity range of ±500 dps and the angular velocity data output from the signal processing portion 16 acquired in step S101 to obtain the third parameter P3.

1.5 First Parameter Checking Step

Next, in step S105, the known angular velocity having the angular velocity range of ±500 dps is applied to the inertial measurement unit 1 and a correction calculation is performed by using the first parameter P1 to obtain the angular velocity data output from the correction calculation portion 18. The known angular velocity value is compared with the corrected angular velocity data to check whether the comparison result is within a desired checking error.

1.6 Second Parameter Checking Step

Next, in step S106, the known angular velocity having the angular velocity range of ±250 dps is applied to the inertial measurement unit 1 and the correction calculation is performed by using the second parameter P2 to obtain the angular velocity data output from the correction calculation portion 18. The known angular velocity value is compared with the corrected angular velocity data to check whether the comparison result is within a desired checking error.

1.7 Third Parameter Checking Step

Next, in step S107, the known angular velocity having the angular velocity range of ±100 dps is applied to the inertial measurement unit 1 and the correction calculation is performed by using the third parameter P3 to obtain the angular velocity data output from the correction calculation portion 18. The known angular velocity value is compared with the corrected angular velocity data to check whether the comparison result is within a desired checking error.

In the present embodiment, the known angular velocity is applied to the inertial measurement unit 1 to calculate the correction parameter. However, a method may be employed in which a reference inertial measurement unit is prepared and a predetermined angular velocity within the detection range is applied to the reference inertial measurement unit and the inertial measurement unit 1 that calculates the correction parameter to calculate the correction parameter from the angular velocity data output by the reference inertial measurement unit and the angular velocity data output by the inertial measurement unit 1 that calculates the correction parameter.

As described above, in the inertial measurement unit 1 of the present embodiment, the parameter control portion 20 selects the selection correction parameter from the plurality of correction parameters related to the detection range of the value of the inertial information based on the correction parameter selection information and corrects the inertial information such as the angular velocity data or the acceleration data using the selection correction parameter according to the detection range of the value of the inertial information in the correction calculation portion 18. Therefore, since the correction can be performed by using the correction parameter in the case of the narrow detection range when the detection range is narrow as compared with when the correction parameter is only the correction parameter in the case of the maximum detection range, for example, it is possible to correct the inertial information with high accuracy when the detection range is narrow. Thus, it is possible to detect the entire detection range of the value of the inertial information with high accuracy using one inertial measurement unit 1.

In the present embodiment, the angular velocity data is corrected according to the detection range of the angular velocity value, but the present disclosure is not limited thereto. The acceleration data may be corrected according to the detection range of the acceleration value. The angular velocity data or the acceleration data may be corrected according to the detection range of the angular velocity and acceleration values. The angular velocity data and the acceleration data may be corrected according to the detection range of the angular velocity and acceleration values.

2. Second Embodiment

Next, an inertial measurement unit 1a according to a second embodiment will be described with reference to FIGS. 4 and 5.

The inertial measurement unit 1a of the present embodiment is the same as the inertial measurement unit 1 of the first embodiment except that a parameter control portion 20a selects the selection correction parameter from the plurality of correction parameters based on the inertial information output from the signal processing portion 16, as compared with the inertial measurement unit 1 of the first embodiment. Differences from the first embodiment described above will be mainly described, and the same matters will be omitted.

Figure 4:
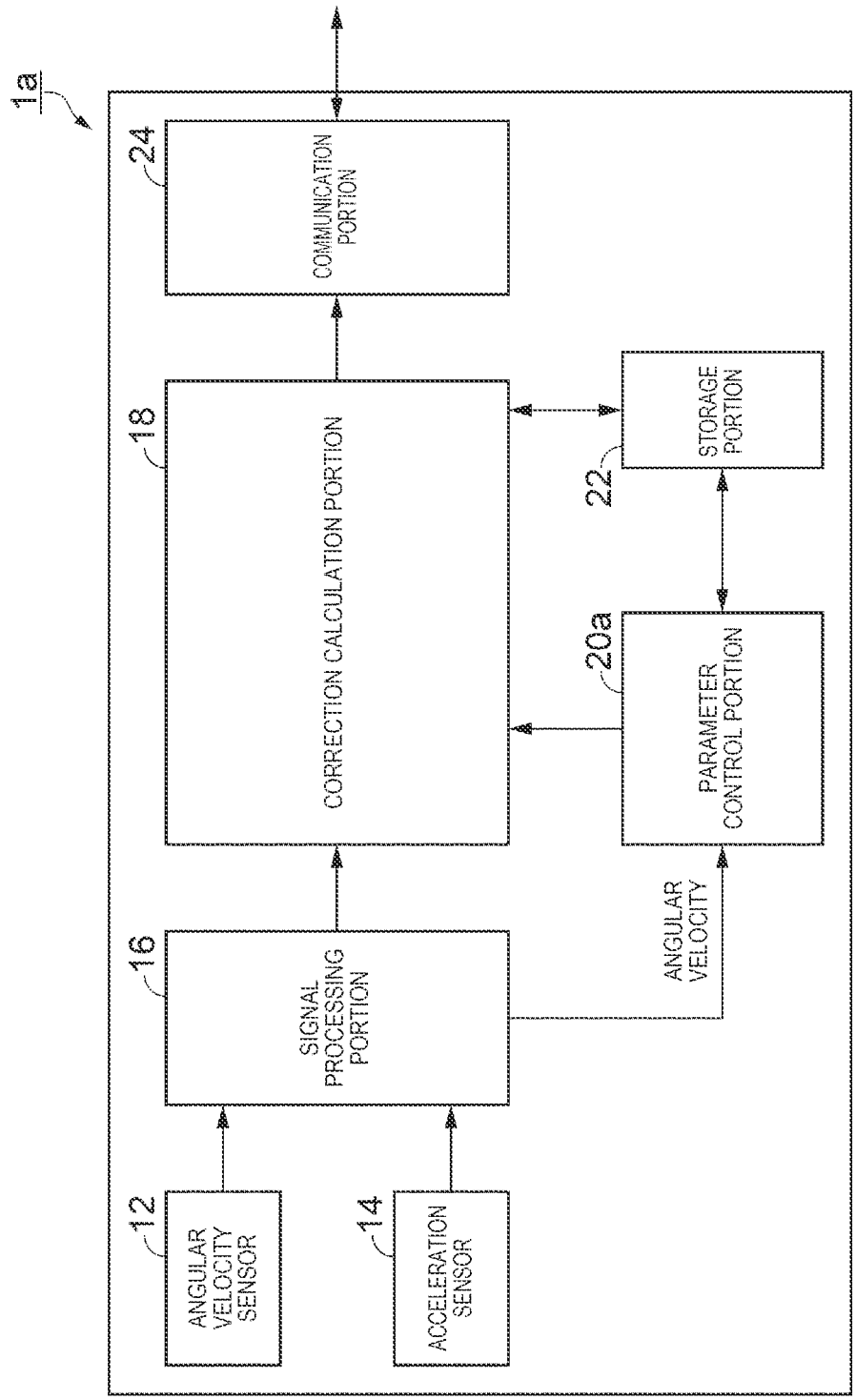
FIG. 4 is a block diagram showing a configuration of an inertial measurement unit according to a second embodiment.

As shown in FIG. 4, the correction calculation portion 18 performs the correction processing on the angular velocity data and the acceleration data using the selection correction parameter selected from the plurality of correction parameters by the parameter control portion 20a based on the angular velocity data, which is the inertial information output from the signal processing portion 16.

The parameter control portion 20a selects the selection correction parameter corresponding to the angular velocity data from among the plurality of correction parameters stored in the storage portion 22 based on the angular velocity data output from the signal processing portion 16 and sets the selected parameter in the correction calculation portion 18.

Figure 5:
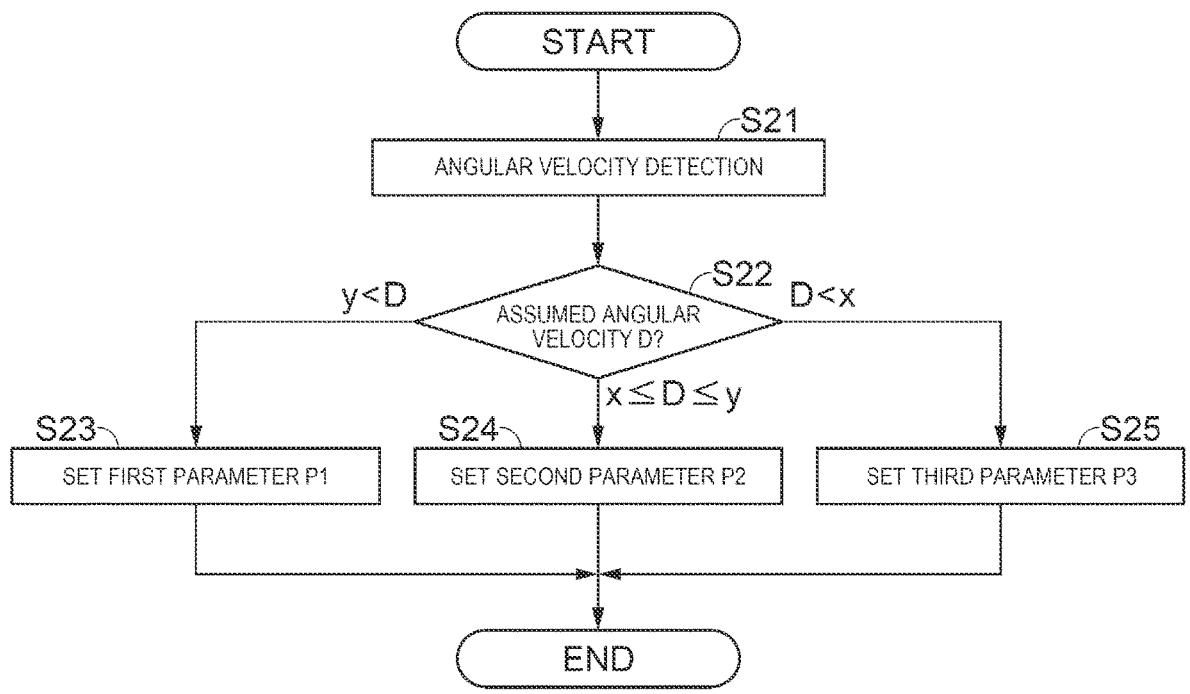
FIG. 5 is a flowchart showing a method of setting a correction parameter of a parameter control portion.

Specifically, as shown in FIG. 5, the angular velocity data from the signal processing portion 16 is detected in step S21. When an assumed angular velocity D, which is the detected angular velocity, is y<D in step S22, the first parameter P1 is selected from the storage portion 22 and is set in the correction calculation portion 18 in step S23. Note that y is, for example, ±250 dps, and the first parameter P1 is, for example, the correction parameter when the detection range of the angular velocity value is ±500 dps.

When the assumed angular velocity D is x≤D≤y, the second parameter P2 is selected from the storage portion 22 and is set in the correction calculation portion 18 in step S24. Note that x is, for example, ±100 dps, and the second parameter P2 is, for example, the correction parameter when the detection range of the angular velocity value is ±250 dps.

When the assumed angular velocity D is D<x, the third parameter P3 is selected from the storage portion 22 and is set in the correction calculation portion 18 in step S25. The third parameter P3 is, for example, the correction parameter when the detection range of the angular velocity value is ±100 dps.

With such a configuration, the inertial measurement unit 1a of the present embodiment can automatically select the optimum selection correction parameter according to the angular velocity data based on the angular velocity data output from the signal processing portion 16, which is the inertial information. Therefore, it is possible to correct the angular velocity data more accurately.

In the present embodiment, the angular velocity data is corrected based on the angular velocity data output from the signal processing portion 16, but the present disclosure is not limited thereto. The acceleration data may be corrected based on the angular velocity data output from the signal processing portion 16. The angular velocity data may be corrected based on the acceleration data output from the signal processing portion 16. The angular velocity data or the acceleration data may be corrected based on the angular velocity data and the acceleration data output from the signal processing portion 16.

3. Third Embodiment

Next, an inertial measurement unit 1b according to a third embodiment will be described with reference to FIGS. 6 and 7.

The inertial measurement unit 1b of the present embodiment is the same as the inertial measurement unit 1 of the first embodiment except that a parameter control portion 20b selects the selection correction parameter from the plurality of correction parameters based on external information from the communication portion 24, as compared with the inertial measurement unit 1 of the first embodiment. Differences from the first embodiment described above will be mainly described, and the same matters will be omitted.

Figure 6:
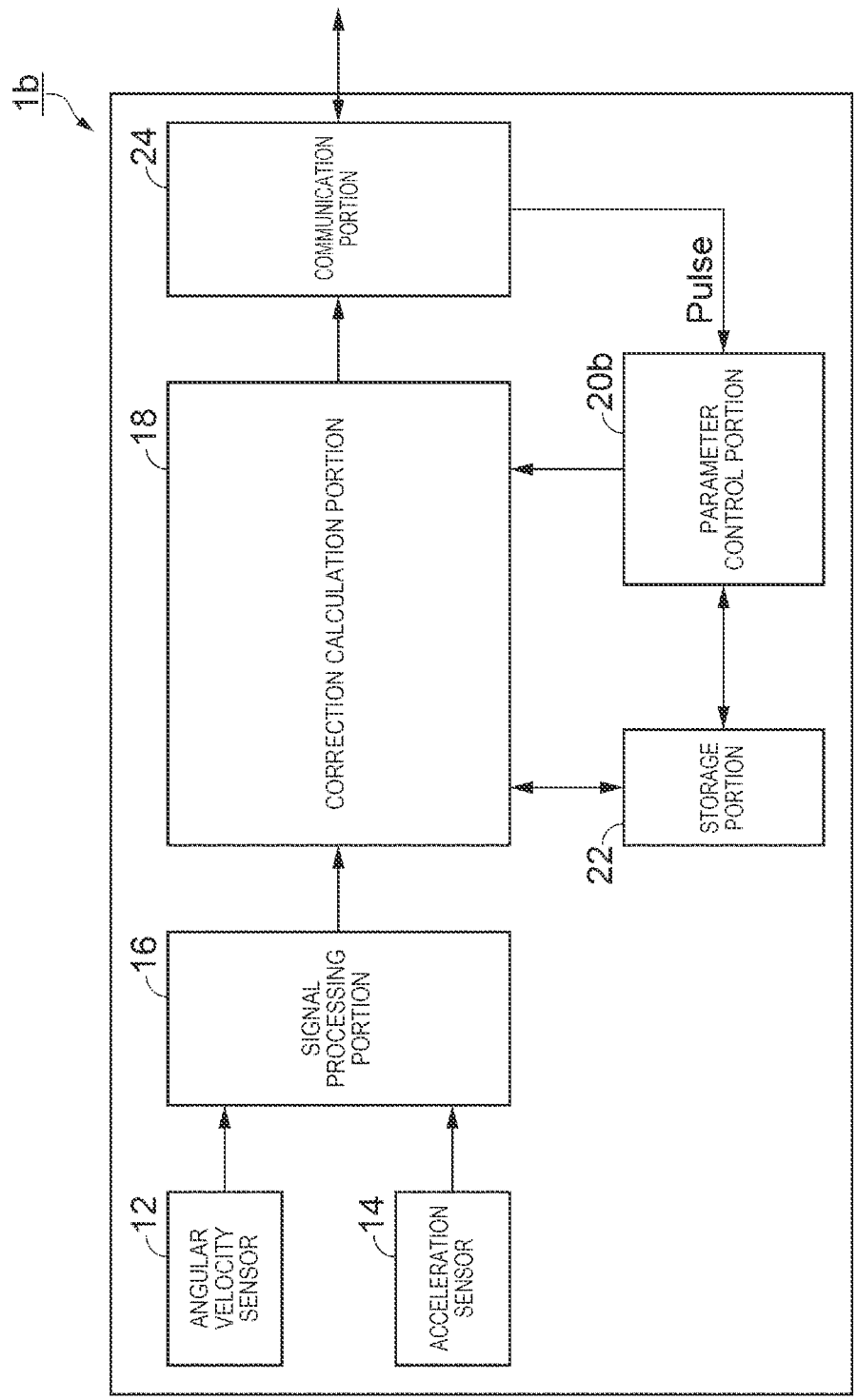
FIG. 6 is a block diagram showing a configuration of an inertial measurement unit according to a third embodiment.

As shown in FIG. 6, the correction calculation portion 18 performs the correction processing on the angular velocity data and the acceleration data using the selection correction parameter selected from the plurality of correction parameters by the parameter control portion 20b based on a Pulse signal, which is the external information from the communication portion 24. The Pulse signal is, for example, an acceleration pulse signal obtained by measuring the acceleration of a moving object equipped with the inertial measurement unit 1b or a Pulse Per Second (PPS) signal output from GPS attached to the moving object.

The parameter control portion 20b selects the selection correction parameter corresponding to the Pulse signal from among the plurality of correction parameters stored in the storage portion 22 based on the Pulse signal, which is the external information from the communication portion 24, and sets the selected parameter in the correction calculation portion 18.

Figure 7:
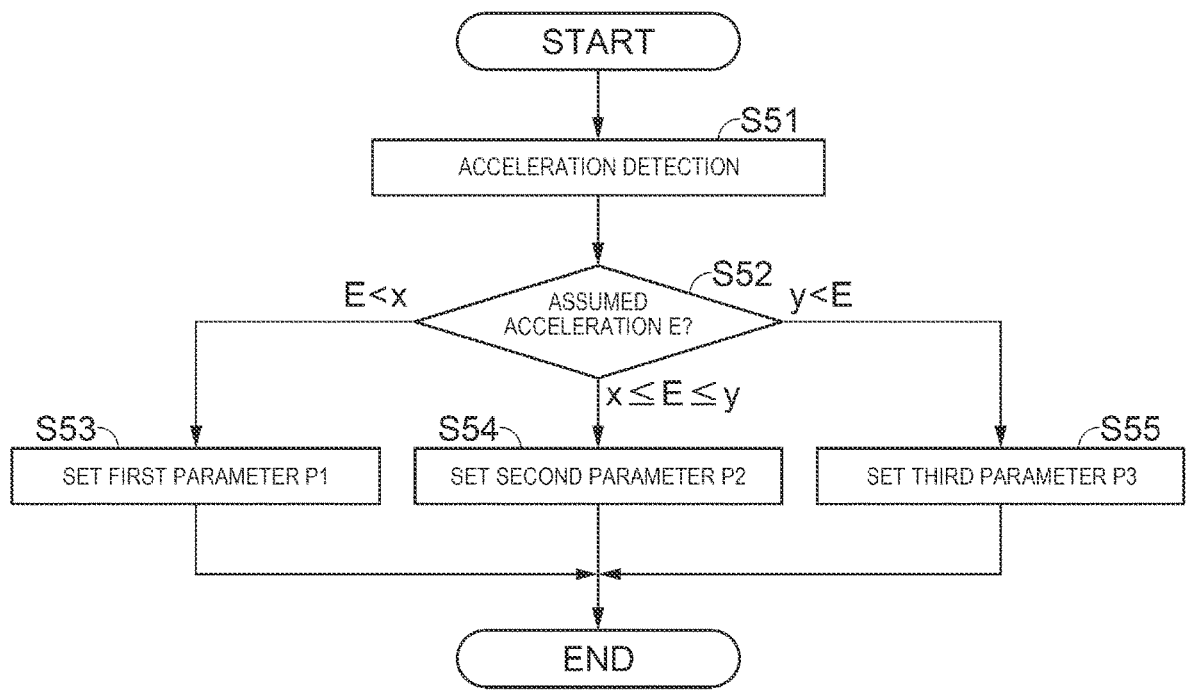
FIG. 7 is a flowchart showing a method of setting a correction parameter of a parameter control portion.

Specifically, as shown in FIG. 7, the acceleration is detected from the Pulse signal from the communication portion 24 in step S51. When an assumed acceleration E, which is the detected acceleration, is E<x in step S52, the first parameter P1 is selected from the storage portion 22 and is set in the correction calculation portion 18 in step S53. Note that x is, for example, 1G, and the first parameter P1 is, for example, the correction parameter when the detection range of the angular velocity value is ±500 dps.

When the assumed acceleration E is x≤E≤y, the second parameter P2 is selected from the storage portion 22 and is set in the correction calculation portion 18 in step S54. Note that y is, for example, 5G, and the second parameter P2 is, for example, the correction parameter when the detection range of the angular velocity value is ±250 dps.

When the assumed acceleration E is y<E, the third parameter P3 is selected from the storage portion 22 and is set in the correction calculation portion 18 in step S55. The third parameter P3 is, for example, the correction parameter when the detection range of the angular velocity value is ±100 dps.

With such a configuration, the inertial measurement unit 1b of the present embodiment can automatically select the optimum selection correction parameter according to the Pulse signal from the Pulse signal, which is external information. Therefore, it is possible to correct the angular velocity data more accurately.

In the present embodiment, the angular velocity data is corrected based on the Pulse signal, which is external information, but the present disclosure is not limited thereto. The acceleration data may be corrected based on the Pulse signal. Both the angular velocity data and the acceleration data may be corrected based on the Pulse signal.

4. Fourth Embodiment

Next, an inertial measurement unit 1c according to a fourth embodiment will be described with reference to FIGS. 8 and 9.

The inertial measurement unit 1c of the present embodiment is the same as the inertial measurement unit 1 of the first embodiment except that a configuration of a correction calculation portion 18c is different and a parameter control portion 20c selects at least two correction parameters as the selection correction parameter based on the external information from the communication portion 24, multiplies each of the selected correction parameters by a weighting coefficient set by a weighting coefficient switching portion 26, and adds the results together, as compared with the inertial measurement unit 1 of the first embodiment. Differences from the first embodiment described above will be mainly described, and the same matters will be omitted.

Figure 8:
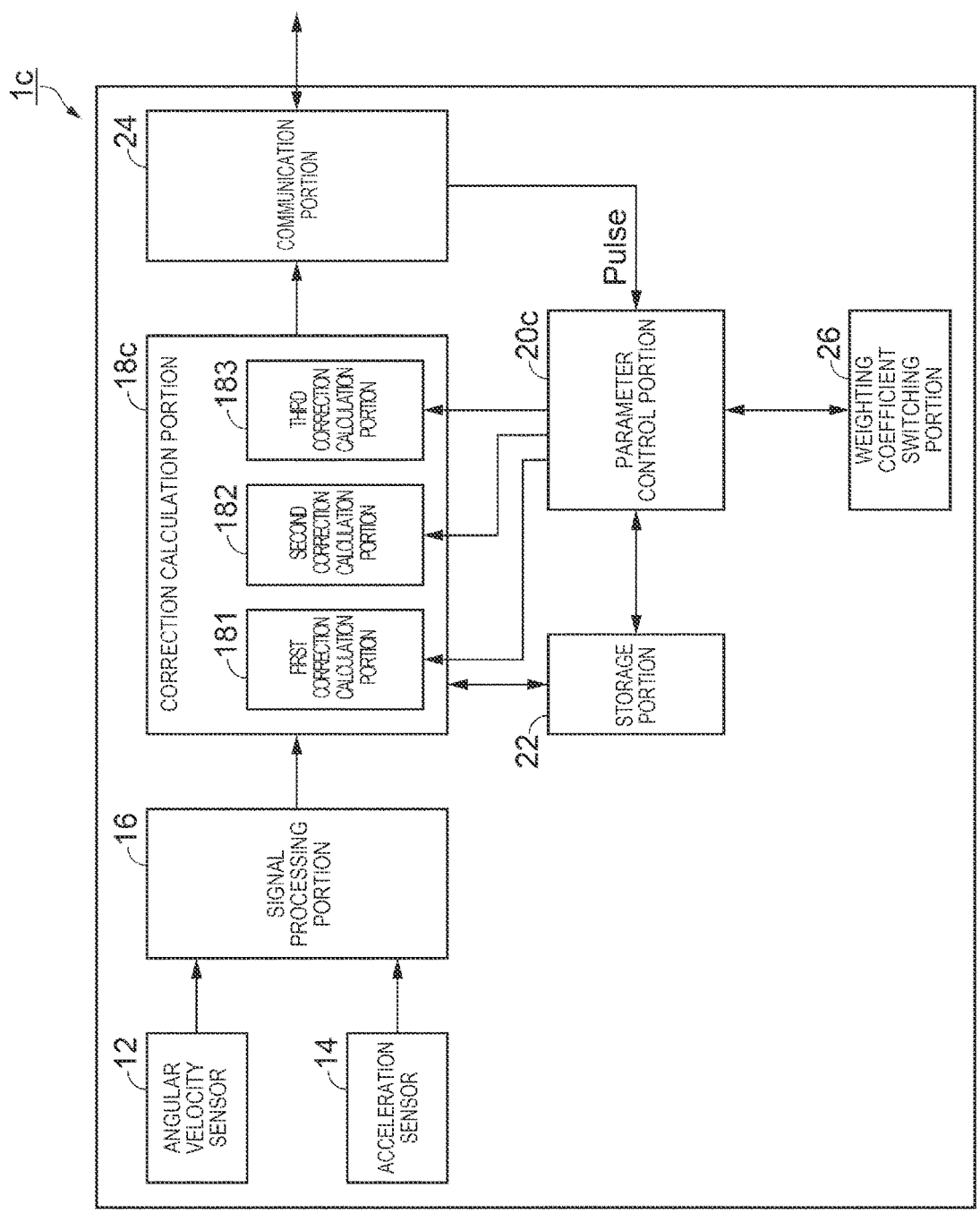
FIG. 8 is a block diagram showing a configuration of an inertial measurement unit according to a fourth embodiment.

As shown in FIG. 8, the inertial measurement unit 1c includes a correction calculation portion 18c having a first correction calculation portion 181, a second correction calculation portion 182, and a third correction calculation portion 183, a parameter control portion 20c, and a weighting coefficient switching portion 26. The parameter control portion 20c selects at least two correction parameters as the selection correction parameter based on the Pulse signal, which is the external information from the communication portion 24, multiplies each of the selected correction parameters by a weighting coefficient R for performing the correction calculation on the inertial information, and adds the results of the correction calculation to perform the correction processing on the inertial information. The Pulse signal is, for example, a vehicle speed pulse signal obtained by measuring a speed of the moving object such as a vehicle t equipped with the inertial measurement unit 1c. In the present embodiment, a case where three correction parameters are selected will be described as an example.

The first correction calculation portion 181 performs the correction calculation on the inertial information, using the correction parameter obtained by multiplying the first parameter P1 selected by the parameter control portion 20c by the weighting coefficient R set by the weighting coefficient switching portion 26.

The second correction calculation portion 182 performs the correction calculation on the inertial information, using the correction parameter obtained by multiplying the second parameter P2 selected by the parameter control portion 20c by the weighting coefficient R set by the weighting coefficient switching portion 26.

The third correction calculation portion 183 performs the correction calculation on the inertial information, using the correction parameter obtained by multiplying the third parameter P3 selected by the parameter control portion 20c by the weighting coefficient R set by the weighting coefficient switching portion 26.

The parameter control portion 20c multiplies the first parameter P1 selected from among the plurality of correction parameters stored in the storage portion 22 by the weighting coefficient R corresponding to the first parameter P1 set by the weighting coefficient switching portion 26 and sets the result in the first correction calculation portion 181.

The parameter control portion 20c multiplies the second parameter P2 selected from among the plurality of correction parameters stored in the storage portion 22 by the weighting coefficient R corresponding to the second parameter P2 set by the weighting coefficient switching portion 26 and sets the result in the second correction calculation portion 182.

The parameter control portion 20c multiplies the third parameter P3 selected from among the plurality of correction parameters stored in the storage portion 22 by the weighting coefficient R corresponding to the third parameter P3 set by the weighting coefficient switching portion 26 and sets the result in the third correction calculation portion 183.

The weighting coefficient switching portion 26 switches the weighting coefficient R for the first parameter P1, the weighting coefficient R for the second parameter P2, and the weighting coefficient R for the third parameter P3, based on the Pulse signal, which is external information from the communication portion 24.

Figure 9:
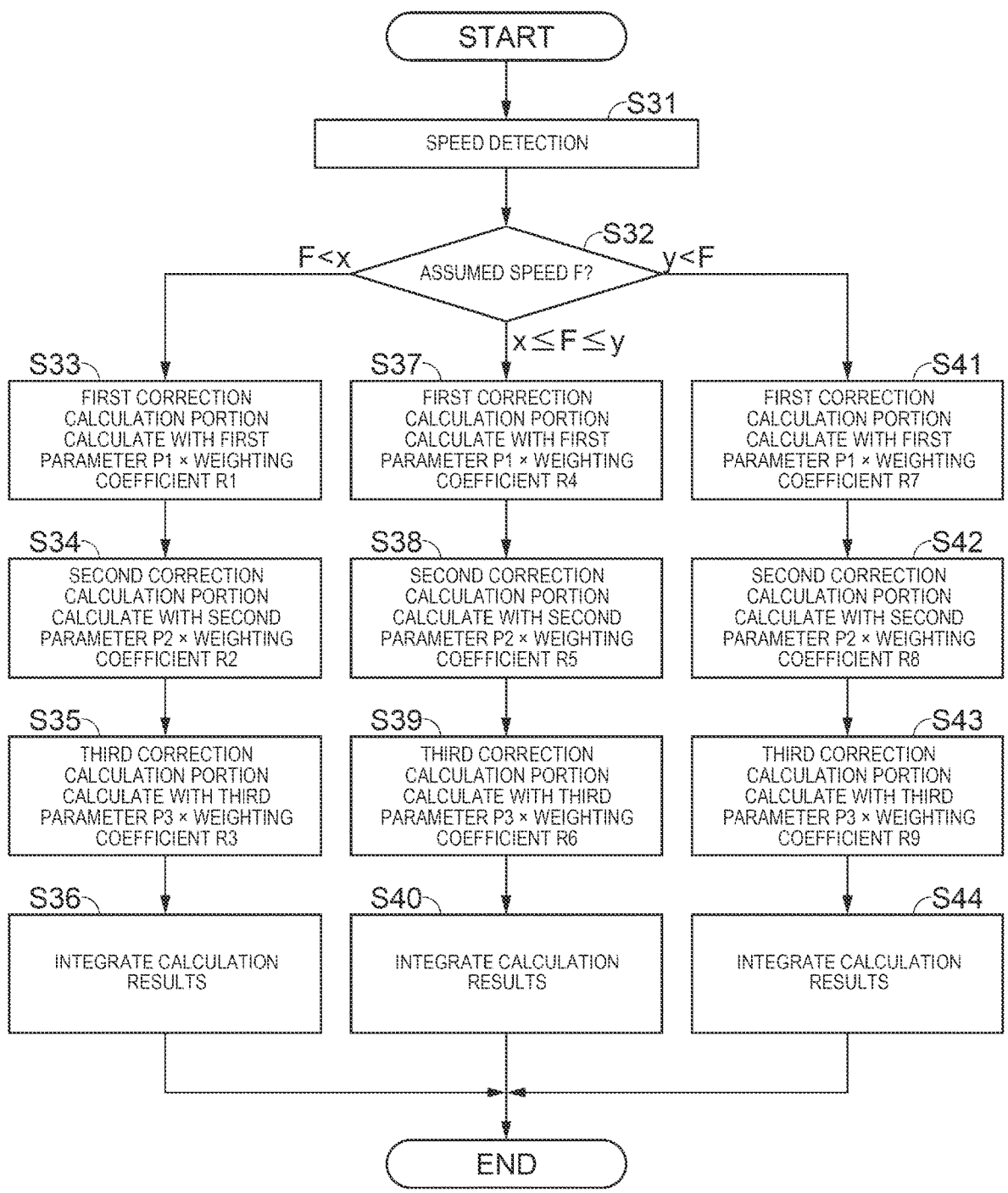
FIG. 9 is a flowchart showing a method of setting a correction parameter of a parameter control portion.

In the correction processing of the inertial information in the correction calculation portion 18c, first, the speed is detected from the Pulse signal from the communication portion 24 in step S31 as shown in FIG. 9. Next, in step S32, conditions are divided according to an assumed speed F, which is the detected speed. Note that x is, for example, 10 Km/h, and y is, for example, 80 Km/h. The first parameter P1 is, for example, the correction parameter when the detection range of the angular velocity value is ±500 dps, the second parameter P2 is, for example, the correction parameter when the detection range of the angular velocity value is ±250 dps, and the third parameter P3 is, for example, the correction parameter when the detection range of the value of the angular velocity is ±100 dps.

When the assumed speed F is F<x, the first correction calculation portion 181 performs the correction calculation on the inertial information using the first parameter P1 multiplied by a weighting coefficient R1 (for example, 0.6) set by the weighting coefficient switching portion 26 in step S33. Next, in step S34, the second correction calculation portion 182 performs the correction calculation on the inertial information using the second parameter P2 multiplied by a weighting coefficient R2 (for example, 0.3) set by the weighting coefficient switching portion 26. In step S35, the third correction calculation portion 183 performs the correction calculation on the inertial information using the third parameter P3 multiplied by a weighting coefficient R3 (for example, 0.1) set by the weighting coefficient switching portion 26. Thereafter, in step S36, the calculation result of the first correction calculation portion 181, the calculation result of the second correction calculation portion 182, and the calculation result of the third correction calculation portion 183 are added to obtain the correction result of the inertial information.

When the assumed speed F is x≤F≤y, the first correction calculation portion 181 performs the correction calculation on the inertial information using the first parameter P1 multiplied by a weighting coefficient R4 (for example, 0.2) set by the weighting coefficient switching portion 26 in step S37. Next, in step S38, the second correction calculation portion 182 performs the correction calculation on the inertial information using the second parameter P2 multiplied by a weighting coefficient R5 (for example, 0.6) set by the weighting coefficient switching portion 26. In step S39, the third correction calculation portion 183 performs the correction calculation on the inertial information using the third parameter P3 multiplied by a weighting coefficient R6 (for example, 0.2) set by the weighting coefficient switching portion 26. Thereafter, in step S40, the calculation result of the first correction calculation portion 181, the calculation result of the second correction calculation portion 182, and the calculation result of the third correction calculation portion 183 are added to obtain the correction result of the inertial information.

When the assumed speed F is y<F, the first correction calculation portion 181 performs the correction calculation on the inertial information using the first parameter P1 multiplied by a weighting coefficient R7 (for example, 0.1) set by the weighting coefficient switching portion 26 in step S41. Next, in step S42, the second correction calculation portion 182 performs the correction calculation on the inertial information using the second parameter P2 multiplied by a weighting coefficient R8 (for example, 0.3) set by the weighting coefficient switching portion 26. In step S43, the third correction calculation portion 183 performs the correction calculation on the inertial information using the third parameter P3 multiplied by a weighting coefficient R9 (for example, 0.6) set by the weighting coefficient switching portion 26. Thereafter, in step S44, the calculation result of the first correction calculation portion 181, the calculation result of the second correction calculation portion 182, and the calculation result of the third correction calculation portion 183 are added to obtain the correction result of the inertial information.

With such a configuration, the inertial measurement unit 1c of the present embodiment can automatically switch the weighting coefficient R of the selection correction parameter according to the movement of the moving object such as a vehicle from the Pulse signal, which is external information. Therefore, it is possible to correct the inertial information more accurately.

5. Fifth Embodiment

Next, a moving object 100 including inertial measurement units 1, 1a, 1b, and 1c according to a fifth embodiment will be described with reference to FIG. 10. In the following description, a configuration to which the inertial measurement unit 1b is applied will be exemplified and described.

The inertial measurement unit 1b of the above embodiment can be effectively used in posture control of a flight unit and the like. A drone, which is an example of the flight unit, will be described as the moving object 100.

Figure 10:
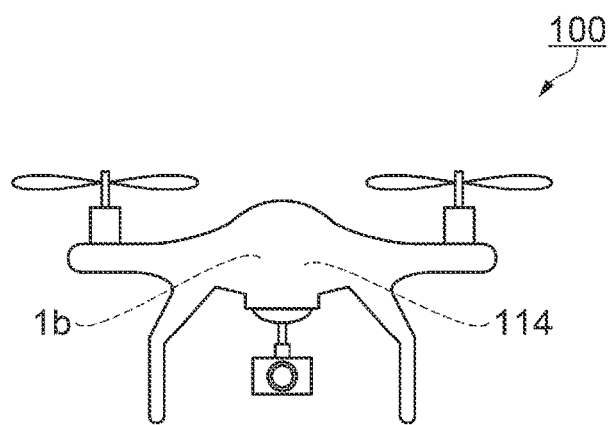
FIG. 10 is a diagram showing a configuration of a moving object including an inertial measurement unit according to a fifth embodiment.

As shown in FIG. 10, the moving object 100 includes the inertial measurement unit 1b and an acceleration sensor 114.

The inertial measurement unit 1b selects the selection correction parameter corresponding to the acceleration information from the plurality of correction parameters related to the detection range of the value of the inertial information of the inertial measurement unit 1b based on the acceleration information from the acceleration sensor 114, which is the external information from the communication portion 24, and corrects the inertial information using the selection correction parameter.

Therefore, when the moving object 100 hovers at a low speed, for example, the angular velocity does not change significantly and thus the angular velocity data is corrected by using the correction parameter having a narrow detection range. When the moving object 100 moves at a high speed, for example, the angular velocity may change significantly and thus the angular velocity data can be corrected by using the correction parameter having a wide detection range. Thus, it is possible to perform the posture control of the moving object 100 with high accuracy.

In the present embodiment, the optimum selection correction parameter according to the inertial information can be automatically selected based on the acceleration information from the moving object 100. Therefore, it is possible to correct the inertial information more accurately and is effective for the posture control of the moving object 100 and the like.

6. Sixth Embodiment

Next, a moving object 600 including the inertial measurement units 1, 1a, 1b, and 1c according to a sixth embodiment will be described with reference to FIGS. 11 and 12. In the following description, a configuration to which the inertial measurement unit 1 is applied will be exemplified and described.

The inertial measurement unit 1 of the above embodiment can be effectively used in the posture control of a construction machine and the like. A hydraulic excavator, which is an example of the construction machine, will be described as the moving object 600.

Figure 11:
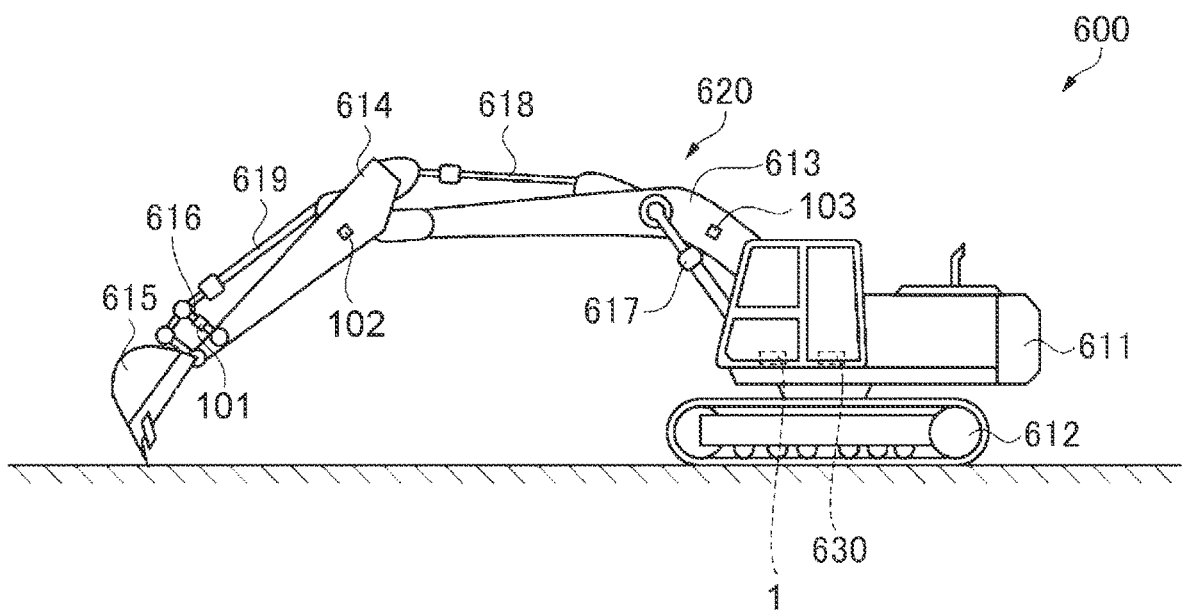
FIG. 11 is a diagram showing a configuration of a moving object including an inertial measurement unit according to a sixth embodiment.

As shown in FIG. 11, in the moving object 600, a vehicle body is configured of a lower traveling body 612 and an upper turning body 611 turnably mounted on the lower traveling body 612, and is provided with a work mechanism 620 configured of a plurality of members that can rotate in a vertical direction on a front side of the upper turning body 611. The upper turning body 611 is provided with a driver seat (not shown), and the driver seat is provided with an operation unit (not shown) that operates each member configuring the work mechanism 620. The inertial measurement unit 1 of the above embodiment that functions as a tilt sensor for detecting a tilt angle of the upper turning body 611 is disposed on the upper turning body 611.

The work mechanism 620 includes a boom 613 attached to the front side of the upper turning body 611 so as to be able to move up and down, an arm 614 attached to a tip end side of the boom 613 so as to be able to move up and down, a bucket link 616 rotatably attached to a tip end side of the arm 614, a bucket 615 rotatably attached to a tip end side of the arm 614 and the bucket link 616, a boom cylinder 617 to drive the boom 613, an arm cylinder 618 to drive the arm 614, and a bucket cylinder 619 to drive the bucket 615 through the bucket link 616, as the plurality of members.

A base end side of the boom 613 is rotatably supported by the upper turning body 611 in the vertical direction, and the boom 613 is rotationally driven relative to the upper turning body 611 by expansion and contraction of the boom cylinder 617. An inertial measurement unit 103 that functions as the inertial sensor for detecting a state of movement of the boom 613 is disposed on the boom 613.

One end side of the arm 614 is rotatably supported on the tip end side of the boom 613, and the arm 614 is rotationally driven relative to the boom 613 by expansion and contraction of the arm cylinder 618. An inertial measurement unit 102 that functions as the inertial sensor for detecting a state of movement of the arm 614 is disposed on the arm 614.

The bucket link 616 and the bucket 615 are rotatably supported on the tip end side of the arm 614, and the bucket link 616 is rotationally driven relative to the arm 614 in response to expansion and contraction of the bucket cylinder 619. In conjunction with this, the bucket 615 is rotationally driven relative to the arm 614. An inertial measurement unit 101 that functions as the inertial sensor for detecting the state of movement of the bucket link 616 is disposed on the bucket link 616.

The inertial measurement units 101, 102, and 103 can detect at least one of the angular velocity or the acceleration acting on each member of the work mechanism 620 or the upper turning body 611. The inertial measurement units 101, 102, and 103 are coupled in series as shown in FIG. 12 and can transmit a detection signal to a calculation unit 630. As described above, with the coupling of the inertial measurement units 101, 102, and 103 in series, it is possible to reduce the number of wirings for transmitting the detection signal in a movable area and to obtain a compact wiring structure. With the compact wiring structure, it is easy to select a wiring laying method and it is possible to reduce the occurrence of deterioration or damage of the wiring.

Figure 12:
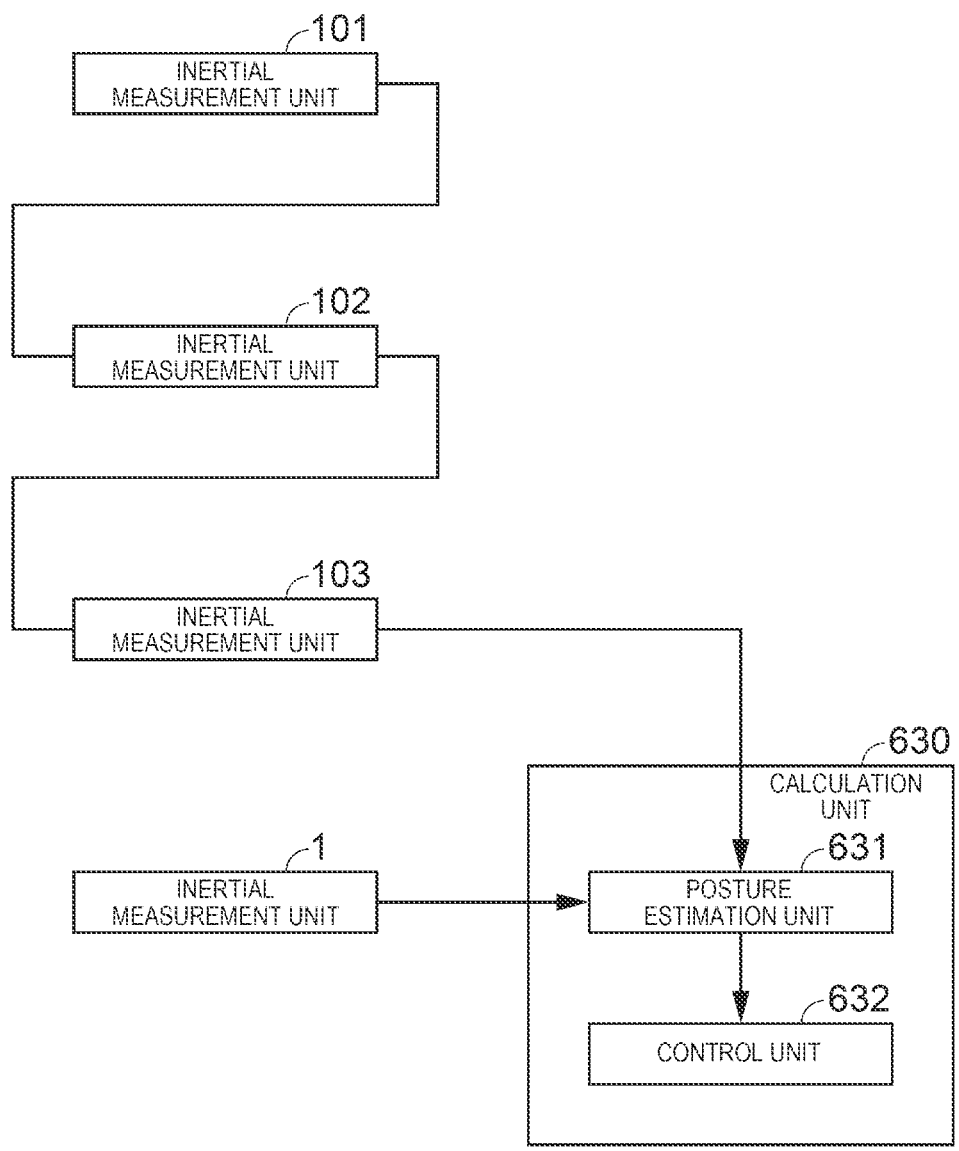
FIG. 12 is a block diagram showing a configuration of the moving object.

Further, as shown in FIG. 12, the moving object 600 is provided with the calculation unit 630 that calculates the tilt angle of the upper turning body 611 and a position posture of the boom 613, the arm 614, and the bucket 615 configuring the work mechanism 620. As shown in FIG. 12, the calculation unit 630 includes a posture estimation unit 631 and a control unit 632. The posture estimation unit 631 estimates posture information of the moving object 600 based on output signals of the inertial measurement units 1, 101, 102, and 103. The control unit 632 controls the posture of the moving object 600 based on the posture information of the moving object 600 estimated by the posture estimation unit 631. Specifically, the calculation unit 630 receives various detection signals from the inertial measurement units 1, 101, 102, and 103 and calculates the position posture or a posture angle of the boom 613, the arm 614, and the bucket 615 or a tilted state of the upper turning body 611 based on the various detection signals. The calculated position posture signal, including the posture angles of the boom 613, the arm 614, and the bucket 615, or tilt signal including the posture angle of the upper turning body 611, for example, the position posture signal of the bucket 615 is used for the display of a monitor unit (not shown) of the driver seat or feedback information for controlling the operation of the work mechanism 620 or the upper turning body 611.

Examples of the construction machine in which the inertial measurement unit 1 of the above embodiment is used include a rough terrain crane (mobile crane), a bulldozer, an excavator/loading machine, a wheel loader, and an aerial work platform (lift vehicle), in addition to the hydraulic excavators (Yumbo, backhoe, and power excavator) exemplified above.

According to the present embodiment, since the inertial measurement unit 1 can obtain the posture information with high accuracy, it is possible to realize appropriate posture control of the moving object 600. With the moving object 600, the compact inertial measurement unit 1 is equipped. Therefore, even in an extremely limited narrow area such as a bucket link 616, it is possible to provide the construction machine in which a plurality of inertial measurement units 1 can be coupled in series (multi-coupling) and disposed compactly for every installation location of the inertial measurement unit 1 or a cable that couples the inertial measurement units 1 installed at each location in series can be pulled around compactly.

In the present embodiment, as the moving object in which the inertial measurement unit 1 is used, a four-wheeled vehicle such as an agricultural machine or the construction machine is described as an example. In addition to the above, examples of the moving object include a motorcycle, a bicycle, a train, an airplane, a bipedal robot, a remote-controlled or autonomous flying body such as a radio-controlled aircraft, a radio-controlled helicopter, or a drone, a rocket, an artificial satellite, a ship, and an automatic guided vehicle (AGV).

Examples in which the inertial measurement unit 1 is used include a wearable device such as a smartphone, a tablet terminal, a smart watch, a smart glass, or a head-mounted display (HMD), a camera having a stabilizer or the like, or an electronic device such as a video camera, in addition to the moving object.

What is claimed is:

1. An inertial measurement unit comprising:
   an inertial sensor that outputs inertial information;
   a signal processing portion sampling the inertial information at a predetermined sampling interval and converting the inertial information into inertial information data D having a digital value;
   a storage unit that stores a plurality of correction parameters related to nonlinear correction coefficients that are errors with respect to a linearity of the inertial information data D;
   a parameter control portion that selects multiple selection correction parameters from the plurality of correction parameters based on external information received from an external source;
   a weighting coefficient switching portion that applies a respective weighting coefficient to each of the selection correction parameters to produce weighted selection correction parameters, with each weighting coefficient adjusted based on an external information signal as the external information indicative of a movement condition of an object equipped with the inertial sensor; and
   a correction calculation portion that corrects the inertial information data D using the weighted selection correction parameters.

* * * * *